Figure 3:
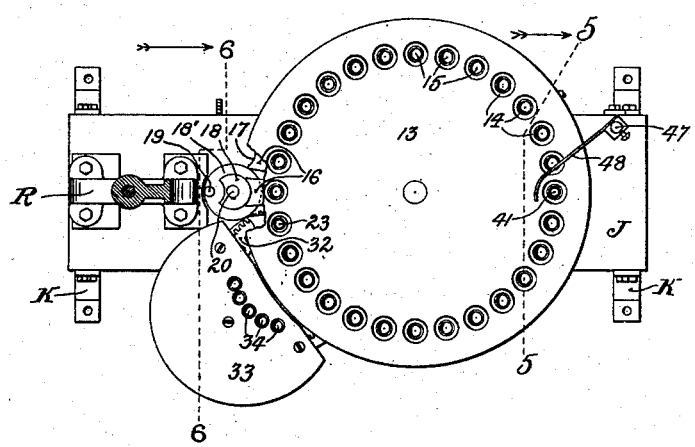

No. 749,697. PATENTED JAN. 12, 1904.
L. MIDDLEKAUFF & C. A. SCHIRM.
FRUIT PITTING AND STUFFING MACHINE.
APPLICATION FILED AUG. 15, 1902.
NO MODEL. 4 SHEETS—SHEET 1.
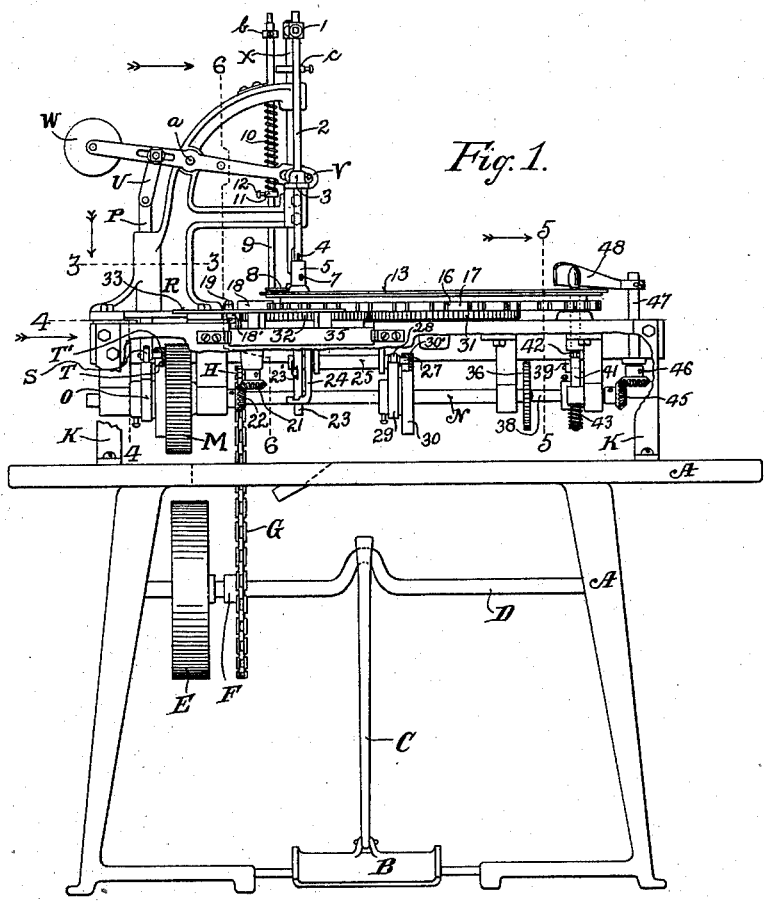
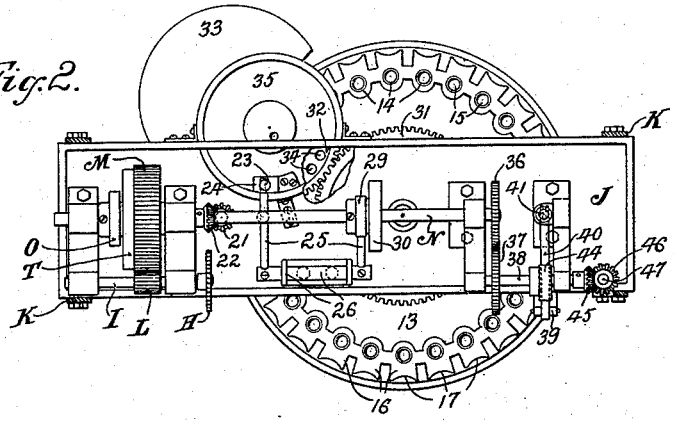
WITNESSES
Chas. L. Hyde.
M. C. Nickelson.
INVENTORS
Lawrence Middlekauff
Carey A. Schirm
BY Hazard & Harpham
ATTORNEYS.

No. 749,697. PATENTED JAN. 12, 1904.
L. MIDDLEKAUFF & C. A. SCHIRM.
FRUIT PITTING AND STUFFING MACHINE.
APPLICATION FILED AUG. 15, 1902.
NO MODEL. 4 SHEETS—SHEET 2.

No. 749,697. PATENTED JAN. 12, 1904.
L. MIDDLEKAUFF & C. A. SCHIRM.
FRUIT PITTING AND STUFFING MACHINE.
APPLICATION FILED AUG. 15, 1902.
NO MODEL. 4 SHEETS—SHEET 3.
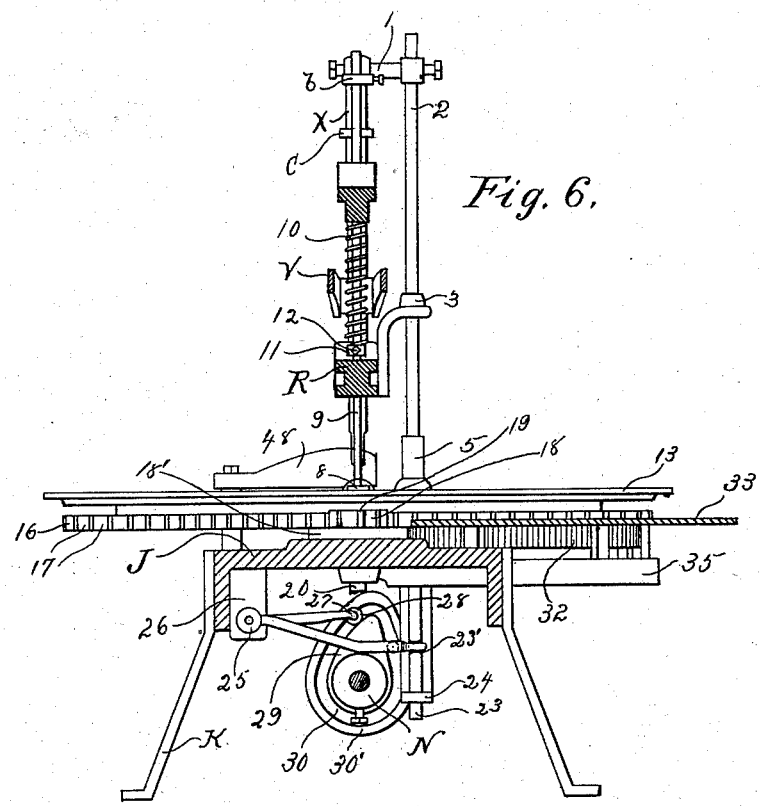
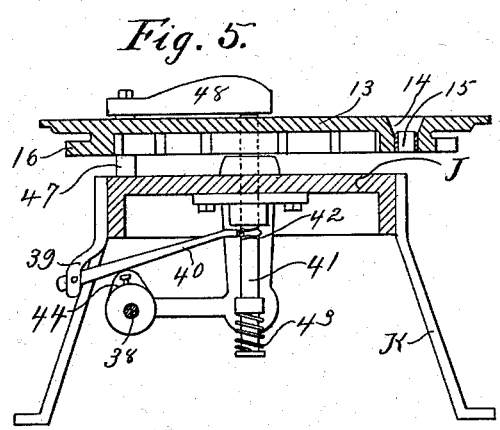

No. 749,697. PATENTED JAN. 12, 1904.
L. MIDDLEKAUFF & C. A. SCHIRM.
FRUIT PITTING AND STUFFING MACHINE.
APPLICATION FILED AUG. 15, 1902.
NO MODEL. 4 SHEETS—SHEET 4.

WITNESSES
Chas. L. Hyde.
M. C. Nickelson.

INVENTORS
Lawrence Middlekauff
Carey A. Schirm
BY Hazard & Harpham
ATTORNEYS.

No. 749,697.

Patented January 12, 1904.

UNITED STATES PATENT OFFICE.

LAWRENCE MIDDLEKAUFF AND CAREY A. SCHIRM, OF LOS ANGELES, CALIFORNIA.

FRUIT PITTING AND STUFFING MACHINE.

SPECIFICATION forming part of Letters Patent No. 749,697, dated January 12, 1904.

Application filed August 15, 1902. Serial No. 119,815. (No model.)

*To all whom it may concern:*

Be it known that we, LAWRENCE MIDDLEKAUFF and CAREY A. SCHIRM, both citizens of the United States, residing at Los Angeles, in the county of Los Angeles and State of California, have invented new and useful Improvements in Fruit Pitting and Stuffing Machines, of which the following is a specification.

Our invention relates to a machine that will first remove the pit from the fruit which it is desired to stuff and then will fill into the fruit a stuffing in the place of the removed pit; and the object thereof is to produce a machine that will accomplish the object much more expeditiously than can be done by hand.

In the description of our machine and in the drawings we have described and illustrated it as applied to pitting and stuffing olives with sweet pickle; but it is equally adapted for removing the pits of other fruits and stuffing the same with any condiment desired.

Figure 4:
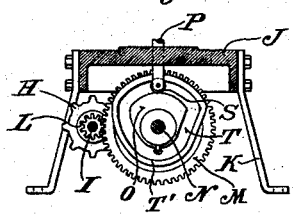
Figure 7:
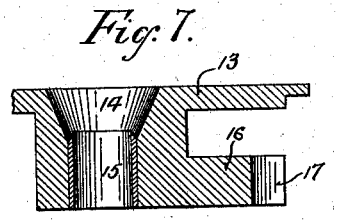
Figure 8:
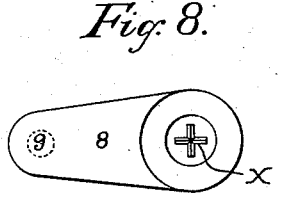
Figure 9:
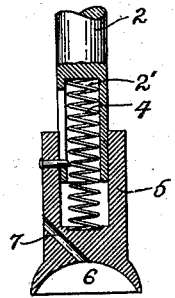

Figure 1 is a side view of our machine. Fig. 2 is a bottom view looking up. Fig. 3 is a view looking down from above, parts being cut off for clearness of illustration at line 3 3 of Fig. 1. Fig. 4 is a view of the front cam mechanism on line 4 4 of Fig. 1. Fig. 5 is a view of the back cam mechanism on line 5 5 of Fig. 3. Fig. 6 is a vertical section taken on a line just back of the sprocket-chains looking toward the rear on line 6 6 of Fig. 3. Fig. 7 is a detail of the fruit-chamber in which the pit is cut out. Fig. 8 is a view looking up at the end of the pitter-rod and the pressure-foot clamp that holds the fruit when being pitted. Fig. 9 is a detail of the lower end of the stuffing pressure-rod which holds the fruit in place while it is being stuffed.

We have illustrated our machine propelled by foot-power; but it may be driven by power derived from any source.

A is the frame of a table, in the lower portion of which is mounted the treadle B, connected by pitman C to the driving-shaft D, on which is mounted the balance-wheel E, which may be used as a pulley for a belt, if desired, and the sprocket-wheel F, around which passes sprocket-chain G. This chain passes around sprocket-wheel H, mounted on shaft I, and imparts motion thereto when the treadle is operated. Shaft I is mounted in bearings affixed to the base-plate J, which is supported by legs K, which legs are affixed to the top of the table. On shaft I is also rigidly mounted gear-wheel L, which meshes with and drives a larger gear-wheel M, rigidly mounted on shaft N, which is revolubly mounted in bearings affixed to the base-plate. The object in using shaft I and making gear M larger than gear L is to reduce the speed of shaft N. Power could be applied directly to shaft N in any suitable manner and the other mechanism dispensed with; but where foot-power is used this connecting mechanism is convenient and useful and is, in fact, almost indispensable. We will hereinafter call shaft N the "driving-shaft," as all the operative moving parts are driven directly or indirectly thereby. Rigidly mounted on the driving-shaft is the elliptical-shaped cam O, the revolution of which causes the reciprocation of the pitter-operating rod P, which moves in a housing partly in the base-plate and partly in the top frame R, which top frame is rigidly bolted to the front end of the base-plate. To lessen the friction on the cam, in a slot in the lower end of rod P is rotatively mounted an idler-wheel S, which rolls upon the face of the cam. The axle on which this wheel is mounted projects through the end of the rod toward the rear end of the machine within the elliptical-shaped flange T' of the face-plate T, which is also rigidly mounted on the driving-shaft. The shape of the inner face of the flange is the same as that of the face of the cam, so as to produce a positive reciprocation of the rod. Rod P is connected by link U with the rocking lever V, which is pivoted to the top frame at $a$. The rear end of this lever carries a counterweight W to balance the weight of the forward end of the lever and the connected parts. To the front end of the rocking lever by a sliding connection is attached the vertically-reciprocating pitter-rod X, the lower end of which is preferably a cross with sharpened edges, as shown in Fig. 8. This pitter-rod reciprocates intermittently and vertically through housings in the top frame, motion of that character being imparted thereto by the elliptical-shaped cam O and connecting mechanism. Affixed to the pitter-rod by cross-bar 1 (shown most clearly in Fig. 6) is the intermittently and vertically reciprocating fruit-stuffing pressure-rod 2, which reciprocates through a brace 3, affixed to the top frame, and holds the fruit firmly in place while being stuffed. In the bottom of this rod is a recess 2', (see Fig. 9,) which provides a housing for the upper end of spiral spring 4, the lower end of which is housed in the fruit-thimble 5, which is vertically movable on the lower end of the fruit-stuffing pressure-rod. In the lower end of this thimble is concave or cup-shaped recess 6, which has a port 7 leading out of the top to prevent fruit-juices from collecting therein when the fruit is being stuffed and to prevent a vacuum being formed over the fruit and holding it in the recess. The pitter-rod also reciprocates through the intermittently and vertically movable fruit-pressure foot 8, (see Figs. 1 to 6 and 8,) which bears upon the fruit while it is being pitted. This pressure-foot is attached to the pressure-foot rod 9, which is vertically movable through housings in the top frame and is just in front of the pitter-rod. This pressure-foot rod is held against upward movement by spring 10, the upper end of which bears against one of the arms of the top frame and the lower end resting on an adjustable collar 11, which surrounds the rod and which can be adjusted by screw 12 to give any desired tension on the spring. On the top of the pressure-foot rod is an adjustable collar $b$, which is adapted to be caught by an adjustable arm $c$, mounted on the pitter-rod at a certain point in its upward movement and which arm carries the pressure-foot and rod upward therewith and out of engagement with the parts below it.

Rotatively mounted on the top of the base-plate is the circular fruit-chamber plate 13, having fruit-chambers 14 therein, the tops of which are flaring. (Shown in detail in Fig. 7.) Each of these chambers is provided with a circular knife 15 for cutting the skin on the end of the fruit when the pit is being ejected therefrom, the pit being forced therethrough by the pitter-rod. The fruit-chamber plate is provided on its lower surface and near the outer edge thereof with a row of cam-engaging teeth 16, in the outer edges of which are crescent-shaped depressions 17. Within these depressions the cresent-shaped fruit-chamber-plate-operating cam 18 revolves and keeps the plate stationary until stud 19, which is mounted on the base-plate 18' of the cam, enters between the teeth and by its movement causes the movement of the fruit-chamber plate to bring a chamber directly below the pitter-rod and the chamber which was below the pitter-rod to move to a position below the stuffing pressure-rod. The fruit-chamber-plate-operating cam is mounted on the upper end of shaft 20, which is revoluble in housings in the base-plate, and carries on its lower end bevel-gear 21, which meshes with and is driven by bevel-gear 22, rigidly mounted on the driving-shaft. The movement of this cam is so timed that when the fruit-chamber plate is moved thereby the pitter-rod and the pressure-foot and the stuffing pressure-rod are all raised to the upward limit of their movement and far enough above the plate that they will not contact with any fruit that may be partly in the chambers.

Below the fruit-chamber plate and directly below the stuffing pressure-rod is the vertically-moving stuffing-plunger 23, which moves through a housing in the base-plate, and a brace 24, which guides the lower end thereof. The stuffing-plunger is operated by the U-shaped rocking lever 25, having two arms, which is pivotally mounted in bearings 26 affixed to the base-plate. One arm of the lever passes through a notch 23' in the stuffing-plunger and causes the reciprocation of the plunger when the lever is moved. In the end of the other arm of the lever, revolubly mounted on axle 27, is an idler-wheel 28, which bears and rolls upon the heart-shaped cam 29, which is rigidly mounted on the driving-shaft. The axle of the idler projects through the arm of the lever and engages within a heart-shaped flange 30' on a face-plate 30, also rigidly affixed to the driving-shaft. The movement of these cams is so timed that the stuffing-plunger reciprocates when there is no movement of the fruit-chamber plate and when the stuffing pressure-rod is at its lowest point of movement and is resting on the fruit in the chambers of the fruit-plate. The fruit-chamber plate below the cam-engaging teeth carries gear-wheel 31, which meshes with teeth on the periphery of, and operates the stuffing-carrying wheel 32, which is partially covered by feeding-plate 33. Wheel 32 is provided with stuffing-chambers 34. The stuffing material is fed into the carrying-wheel through the feed-plate. The stuffing-carrying wheel is rotatively mounted on a supporting-plate 35, which can be cast integral with and form part of the base-plate. The stuffing-plunger reciprocates through the stuffing-chambers.

On the rear end of the driving-shaft is gear 36, which meshes with gear 37, which last gear is rigidly mounted on the ejector-operating shaft 38, rotatively mounted in bearings projecting downward from the base-plate. Pivoted in the bearings 39, which are rigidly secured to the base-plate and, if desired, might be cast integral therewith, is the ejector-operating lever 40, the front end of which is preferably bifurcated and straddles the ejector-plunger 41, the furcated arms passing through notches 42 therein. The ejector-plunger reciprocates vertically in housings in and affixed to the base-plate and through the chambers in the fruit-chamber plate successively to eject the fruit therefrom. It is held pressed downward by spring 43 on the lower end thereof. Rigidly mounted on the ejector-operating shaft is an elliptical cam 44, which gives to the ejector-operating lever an intermittent motion so timed that the ejector-plunger reciprocates each time the fruit-chamber plate is at rest. On the end of ejector-operating shaft is bevel-gear 45, which meshes with and operates bevel-gear 46, which last gear is rigidly mounted on the vertically-rotating clearance-shaft 47, which carries clearance-arm 48, preferably curved. This clearance-arm makes one revolution every time the ejector-plunger reciprocates and is so arranged that it will pass over the chamber in the fruit-chamber plate while the end of the ejector-plunger is therein. The clearance-arm carries the fruit off the fruit-chamber plate to a suitable receptacle.

We will describe the operation of our machine applied to the pitting and stuffing of olives; but it is applicable for other fruits. Power being applied to operate the machine at a suitable speed, olives are placed by hand in the top of the fruit-chambers, with the stem end downward. At the same time appropriate stuffing material is fed into the stuffing-carrying wheel, one operator being provided to feed the olives and one the stuffing material. It will be observed that as long as the pitter-bar, pressure-foot, and stuffing pressure-rod are down, as shown in the drawings, the fruit-chamber plate does not move. As soon as these parts have been caused to move to the full length of their upward stroke they become stationary, and the fruit-chamber plate begins to move and to bring one of the fruit-chambers directly beneath the pitter-bar, while the chamber next thereto is brought directly beneath the stuffing pressure-rod, when the motion of the fruit-chamber plate ceases and the pressure-foot and stuffing pressure-rod descend upon the olives in the respective chambers and hold them firmly therein, the olives being held above the top of the knives in the chambers. The pitter-bar still continues its downward motion and ejects the pit from the olive, which pit falls into suitable receptacle. At the same time the pitter-bar is ejecting the pit the stuffing-plunger moves upward through the stuffing-chambers and forces the material therein up into the olive. The stuffing-plunger then moves downward, and the pitter-bar, pressure-foot, and the stuffing pressure-rod move upward, and when these parts have reached the limit of their movement the fruit-chamber plate and the stuffing-carrying wheel are moved to bring another olive in register for pitting, another in register for stuffing, and stuffing material in register to be forced into the pitted olive, when the operation is repeated.

Our machine may be used for stuffing other pit-bearing fruits and may be used without the stuffing attachment for pitting olives and other fruits.

Having described our invention, what we claim as new, and desire to secure by Letters Patent, is—

1. A fruit pitting and stuffing machine comprising a base-plate; a circular fruit-chamber plate revolubly and horizontally mounted on said base-plate; circular fruit-chambers in said plate having flaring tops; circular knives in said chambers; means to revolve said fruit-chamber plate intermittently; a stuffing-holding wheel revolubly and horizontally mounted on said base-plate below said fruit-chamber plate adapted to be revolved by said fruit-chamber plate; a top frame affixed to said base-plate; a pitter-rod mounted in said top frame above said fruit-chamber plate; means to intermittently move said pitter-rod vertically through the chambers in the fruit-chamber plate and to raise the same above said plate; a downwardly-spring-pressed pressure foot and rod mounted in said top frame; means to raise said pressure-foot and rod on the upward movement of said pitter-rod; a stuffing pressure-rod vertically mounted in the top frame connected to said pitter-rod; a stuffing-plunger vertically mounted below said stuffing-holding wheel; and means to cause said plunger to intermittently reciprocate vertically through said wheel and into the fruit-chamber.

2. In a fruit pitting and stuffing machine a revoluble plate provided with chambers for fruit, a stuffing-carrying revoluble plate having chambers therein adapted to receive the stuffing material; and means to bring said chambers in said two plates into successive register one after another; and means to eject the stuffing material out of the stuffing-chamber into the fruit in the fruit-carrying chamber.

3. In a fruit pitting and stuffing machine having a base-plate and a top frame secured thereto, a circular fruit-chamber plate revolubly and horizontally mounted on said base-plate and having circular flaring-mouth fruit-chambers therein arranged in a circle; circular knives in said chambers extending into the flaring mouth; means to revolve said fruit-chamber plate intermittently; a pitter-rod, a pressure foot and rod, and a stuffing pressure-rod mounted in said top frame; means to intermittently and vertically move said pitter-rod, pressure foot and rod, and stuffing pressure-rod; a stuffing-holding wheel revolubly and horizontally mounted on said base-plate below said fruit-chamber wheel, having therein stuffing-holding chambers arranged in a circle and being provided with exterior cog-gear adapted to mesh with exterior cog-gear on the lower part of the fruit-chamber plate; a stuffing-plunger vertically mounted below said stuffing-carrying wheel; and means to cause said plunger to intermittently reciprocate vertically through said chambers in said stuffing-carrying wheel and into the chambers of the fruit-chamber plate, comprising a U-shaped rocking lever pivotally affixed to said base-plate, said lever having two arms, one of which passes through a notch in the side of said plunger, the other arm resting on a heart-shaped cam mounted on the driving-shaft and having a pin projecting therefrom; a heart-shaped cam mounted on said driving-shaft and adapted to engage said arm; and a face-plate having a heart-shaped flange adapted to engage said pin on said arm.

4. In a fruit pitting and stuffing machine having a base-plate, the combination of a fruit-chamber plate having fruit-chambers therein, revolubly and horizontally mounted on said base-plate; and means to intermittently move said plate; with means to eject fruit from said chambers in said plate, comprising an ejector-plunger below said plate adapted to reciprocate through said chambers; and means to cause the reciprocation of said plunger, comprising a downwardly-operating spring on the lower end of said plunger; a lever pivoted to bearings affixed to said base-plate and having the free end thereof bifurcated, the furcated arms straddling and passing through notches in said plunger; and means to remove the fruit from said fruit-chamber plate, comprising a shaft vertically mounted in said base exterior said fruit-chamber plate having a curved arm on the top thereof, adapted to be moved by the rotation of said shaft over the chamber in which the ejector-plunger is in while said plunger is at the upward limit of its stroke and to carry the fruit ejected thereby off said plate; a bevel-gear on the lower end of said vertical shaft; a bevel-gear on a horizontal shaft mounted in bearings affixed to said base-plate and adapted to mesh with the gear on the vertical shaft; a gear-wheel on said horizontal shaft; a second gear-wheel on the driving-shaft adapted to mesh with said gear on said horizontal shaft.

In witness that we claim the foregoing we have hereunto subscribed our names this 4th day of August, 1902.

LAWRENCE MIDDLEKAUFF.
CAREY A. SCHIRM.

Witnesses:
G. E. HARPHAM,
M. C. NICKELESON.